United States Patent

Ziebarth et al.

Patent Number: 5,882,616
Date of Patent: *Mar. 16, 1999

[54] CATALYST AND METHOD FOR OXIDIZING OXYGEN-CONTAINING ORGANIC COMPOUNDS IN WASTE GAS

[75] Inventors: Michael Scott Ziebarth, Columbia, Md.; Cristian Libanati, Washington, D.C.; Mohit Uberoi, Ellicott, Md.

[73] Assignee: Megtec Systems, Inc., DePere, Wis.

[*] Notice: This patent issued on a continued prosecution application filed under 37 CFR 1.53(d), and is subject to the twenty year patent term provisions of 35 U.S.C. 154(a)(2).

[21] Appl. No.: 730,730

[22] Filed: Oct. 15, 1996

Related U.S. Application Data

[63] Continuation of Ser. No. 481,991, Jun. 7, 1995, Pat. No. 5,789,339.

[51] Int. Cl.$^6$ ................................................. B01D 53/44
[52] U.S. Cl. .................................... 423/245.3; 423/245.1; 423/247
[58] Field of Search ............................. 423/245.3, 245.1, 423/247

[56] References Cited

U.S. PATENT DOCUMENTS

| | | | |
|---|---|---|---|
| 4,001,371 | 1/1977 | Remeira et al. | 423/213.2 |
| 4,009,242 | 2/1977 | Lauder et al. | 423/213.2 |

(List continued on next page.)

FOREIGN PATENT DOCUMENTS

| | | |
|---|---|---|
| 0 373 648 A2 | 6/1990 | European Pat. Off. |
| 38 11 588 A1 | 10/1989 | Germany. |
| 42 17 339 A1 | 12/1993 | Germany. |
| 43 26 938 A1 | 2/1995 | Germany. |
| 1-266851 A | 10/1989 | Japan. |
| 3-161052 A | 7/1991 | Japan. |
| 3-288549 | 12/1991 | Japan. |
| 4-122455 | 4/1992 | Japan. |
| 4-135640 A | 5/1992 | Japan. |
| WO93/10886 | 6/1993 | WIPO. |

OTHER PUBLICATIONS

Noritaka Mizuno et al., Preparation of Perovskite-type Mixed Oxide ($La_{1-x}Sr_xCoO_3$) Supported on Cordierite, Chemistry Letters, 1986, no month pp. 1333–1336. The Chemical Society of Japan.

(List continued on next page.)

*Primary Examiner*—Gary P. Straub
*Assistant Examiner*—Timothy C. Vanoy
*Attorney, Agent, or Firm*—Mitchell D. Bittman; Kevin S. Lemack

[57] ABSTRACT

The present invention generally relates to supported perovskites of the formula $XYO_3$ where X is lanthanum, cerium or yttrium and Y is a transition metal such as copper, chromium, manganese, iron, cobalt and nickel supported on a support such as alumina, silica, magnesium aluminate, titanium oxide, zirconium oxide and mixtures thereof. In the case where X is lanthanum, some of the lanthanum ions may be replaced resulting in a perovskite of the formula $La_{1-x}A_xYO_3$ wherein x is about 0.75 or less and A is silver or magnesium and Y is manganese or iron. Their use for low temperature oxidation of volatile organic compounds (VOCs), particularly oxygen-containing VOCs. The support may be stabilized by having an intermediate metal oxide layer on the surface of the support wherein the metal of the intermediate metal oxide may be iron, magnesium, cobalt, nickel, manganese, zinc, titanium, copper, chromium, lanthanum, barium, calcium, strontium or silver. The catalysts contain platinum or palladium. The present invention further relates to the use of supported perovskites to reduce the amount of VOCs present in waste gases produced by processes such as baking, brewing, and flexographic printing. Catalysts prepared from the supported perovskites have increased resistance to poisoning in the presence of sulfur containing compounds.

12 Claims, 12 Drawing Sheets

U.S. PATENT DOCUMENTS

| | | | |
|---|---|---|---|
| 4,055,513 | 10/1977 | Wheelock | 252/462 |
| 4,089,810 | 5/1978 | Diwell et al. | 252/462 |
| 4,126,580 | 11/1978 | Lauder | 252/462 |
| 4,136,063 | 1/1979 | Kimura et al. | 252/466 J |
| 4,140,655 | 2/1979 | Chabot et al. | 252/462 |
| 4,151,123 | 4/1979 | McCann, III | 252/462 |
| 4,258,218 | 3/1981 | Dwyer et al. | 568/698 |
| 4,321,250 | 3/1982 | Hart | 423/652 |
| 4,337,028 | 6/1982 | Angwin et al. | 431/7 |
| 4,363,361 | 12/1982 | Madgavkar et al. | 166/256 |
| 4,451,578 | 5/1984 | Setzer et al. | 502/303 |
| 4,497,902 | 2/1985 | Bertolacini et al. | 502/65 |
| 4,522,940 | 6/1985 | Sambrook et al. | 502/328 |
| 4,849,398 | 7/1989 | Takada et al. | 502/303 |
| 4,921,829 | 5/1990 | Ozawa et al. | 502/302 |
| 5,026,945 | 6/1991 | Campbell | 585/500 |
| 5,149,516 | 9/1992 | Han et al. | 423/415 A |
| 5,380,692 | 1/1995 | Nakatsuji et al. | 502/303 |
| 5,397,758 | 3/1995 | Bouruetaubertot et al. | 502/303 |

OTHER PUBLICATIONS

Athanasios K. Ladavos et al., Structure and catalytic activity of perovskites La—Ni—O supported on alumina and zirconia, Applied Catalysis B: Environmental, 2 (1993) 27–47. No month.

Collongue et al., Catalytic Combustion of Methane over Bulk and Supported $LaCrO_3$ Pervoskites, Chem. Soc. Faraday Trans., No month 1991, 87(15), 2493–2499.

H.M. Zhang et al., Preparation of Supported $La_{1-x}Sr_xMnO_3$ Catalysts by the Citrate Process, Applied Catalysis, 41 (1988) 137–146. No month.

CATALYST AND METHOD FOR OXIDIZING OXYGEN-CONTAINING ORGANIC COMPOUNDS IN WASTE GAS

This application is a continuation-in-part of U.S. Ser. No. 481,991, filed Jun. 7, 1995 now U.S. Pat. No. 5,789,339.

Related application, Docket No. 01-9309, U.S. Ser. No. 08/721,071, filed Sep. 26, 1996, is a divisional of U.S. Ser. No. 481,991, filed Jun. 7, 1995.

FIELD OF THE INVENTION

The present invention generally relates to supported oxidation catalysts and their use for low temperature oxidation of volatile organic compounds (VOCs). More particularly, the present invention relates to the use of supported perovskite catalysts to reduce the amount of oxygen-containing VOCs present in waste gases produced by processes such as fermentation, baking, brewing, and flexographic printing.

BACKGROUND OF THE INVENTION

Concerns over the release of various organic compounds into the atmosphere as components of waste gas has led to more and more stringent demands on industry to reduce emissions. The Environmental Protection Agency, for example, has recently enacted provisions concerning the amount of alcohol(s) which may be released into the atmosphere, such as ethanol and other alcohols released as components of the waste gases produced and/or released during fermenting processes.

Fermentation involves the metabolism of organic compounds by microorganisms. Compounds that are produced through fermentation include carboxylic acids such as lactic acid and alcohols such as ethanol. Molds, yeasts, bacteria and streptomycetes are all employed in fermentation processes.

Fermentation plays a role in the preparation and/or processing of many foodstuffs, including alcoholic beverages, such as beer and wine, vinegar, bakery products and the like. As a result, waste gases produced in such preparation and/or processing may include significant levels of oxygen-containing VOCs, such as alcohols, ethers, esters and carboxylic acids.

The brewing of beer, for example, includes the step of fermentation of a farinaceous extract obtained from a starchy raw material, barley, in the form of a malt. Other starchy raw materials that may be employed as the starting material are corn, rice, wheat, oats, potatoes and mixtures thereof.

The process for brewing beer involves mashing the malted barley with water, filtering off the solids and boiling the resultant filtrate (called a wort) with hops. The wort is then cooled and yeasts added.

During malting, enzymes, such as amylases, are released from the barley that transform the starchy raw material into fermentable sugars. These fermentable sugars are subsequently converted to ethanol and carbon dioxide by yeasts added to the wort. The beer is then processed and matured before marketing.

Bakery products include perishable foods, such as breads and cakes, and dry baked goods, such as cookies, crackers, pretzels, ice cream cones and the like. The total value of the entire baking industry in the United States exceeds $11,000,000,000.

Many bakery products tend to be highly perishable foods. Much of the production of these goods is therefore done in small plants distributed throughout the United States. From the plants, distribution of perishable bakery products is made within a relatively limited area, unless the product is first frozen to preserve its freshness for a longer distribution period. According to the 1977 Census of Manufactures, these small plants account for almost 75% of the total baking facilities in the United States.

Dry baked products, such as cookies, crackers and pretzels, have a relatively longer shelf life and can therefore be manufactured at a large central location and distributed over a wide area. According to the 1977 Census of Manufactures, there were 24 of these large facilities preparing dry baked products, with a combined output of $2,800,000,000.

Ingredients in bakery products, both perishable products and dry baked products, generally include the following: flour; leavening agents; sugar, such as corn syrups, sucrose and dextrose; fats and oils, such as animal fats and vegetable oils; milk; eggs; salt; and flavoring and enriching ingredients. Leavening agents may be loosely classified into two general categories: yeast, such as fresh compressed yeast or active dry yeast, and chemical leavening agents, such as baking powders. Yeast-raised products make up nearly two-thirds of the total dollar volume of the baking industry.

Most breads and other yeast-raised products are prepared by a sponge-dough process which has four basic steps. First, a sponge of flour, water, yeast and sugar is mixed and allowed to ferment. The sponge is then mixed with any additional ingredients, such as fats or milk, to develop the gluten in the dough. Alternatively, liquid sponges, which contain less flour, may be employed.

After a rest period, the dough is cut and shaped and allowed to rise. The leavening action of yeast is based upon its ability to break down the fermentable sugars in the dough, forming carbon dioxide and ethanol.

Once the dough has been allowed to rise, it is baked. During baking, the ethanol in the dough produced by the leavening action of the yeast is released to the atmosphere.

Malt vinegar is produced by surface or submerged-culture oxidation of malted barley, optionally mixed with one or more other grains. Amylases released from the malted barley convert the starches to fermentable sugars, such as glucose and maltose. These sugars are readily fermented by Saccharomyces yeast.

In addition to the above, there are a great number of other common processes that also involve release of VOCs, in particular, oxygen-containing VOCs, into the atmosphere. For example, in flexographic printing processes emissions arise from organic solvents that may be present in the ink and from solvent that may be used for press cleaning. Emissions are limited in all cases to VOCs.

Solvents commonly used in flexographic printing include ethanol, isopropanol, N-propanol, hexane, toulene, isopropyl acetate, N-propyl acetate, glycols, glycol ethers. In publication flexo, amines and glycols are typical VOC compounds used. Amines and glycols are utilized in quantities that never exceed 5% of the ink formulation (prior to dilution with water). In packaging flexo, VOCs content may be higher than 5%, particularly if alcohols are used as cosolvents. In use at the press, the allowable VOCs in the diluted ink may be no more than 25% of the solvent portion.

Emission control strategies for flexographic printing processes typically include solvent recovery and catalysts or thermal oxidation incineration. Thermal oxidation relies on high temperature, e.g., 1400°–1500° F., turbulence and adequate retention time to facilitate the combustion of VOCs into carbon dioxide and water. Catalytic incineration, on the other hand, is a low temperature, i.e., 500°–750° F. process which relies on a catalyst to convert the VOCs.

In catalytic oxidation procedures, a major concern is the presence of potential poisons in a waste gas stream containing the VOCs to be treated. The nature of the poisons may vary from process to process. Poisons bind chemically to the active sites of a catalyst and destroys its catalytic activity. Only chemical or heat treatment can sometimes reverse the effect of poisons.

Sulfur is among the most ubiquitous potential poisons. Sulfur containing compounds originate from several sources, including sulfur containing organic compound present in fermentation processes or some printing inks. The most common source of sulfur comes however from combustion of natural gas or fuel oils. The trace amounts of odorous compounds containing sulfur present in the fuel result in the presence of sulfur oxides ($SO_2$ and $SO_3$) in the combustion products. Fuel fired baking ovens, natural gas fired dryers and direct fired furnaces present in most bakery and printing processes result in varying amounts of sulfur oxides in the waste gas stream. A fuel fired burner is most commonly used in catalytic oxidizers to heat-up the process gases before they reach the catalyst, which ensures that sulfur oxides will be present in the gas stream.

Although the amounts of sulfur in a waste gas stream is usually in the ppb range, its cumulative effect over time can be significant and can reduce the lifetime of a catalyst.

Thus, there exists a need in various industries for catalysts and methods which can efficiently reduce the level of VOCs, in particular oxygen containing VOCs, in waste gases at low temperature. There is also a need for oxidation catalysts useful for the destruction of VOCs which offer increased resistance to poisoning in the presence of sulfur.

SUMMARY OF THE INVENTION

Accordingly, the present invention provides a novel oxidation catalyst which can reduce the amount of VOCs in a waste gas stream. In particular, the catalyst of the invention is useful for reducing the amount of oxygen-containing VOCs in a waste gas stream by oxidizing the compounds to carbon dioxide and water at low temperature.

The present invention also provides a catalyst for reducing the amount of VOCs, in particular oxygen-containing VOCs, which catalyst has increased resistance to poisoning by sulfur compounds. The catalyst of the invention offers significant economic advantages by extending the life of catalyst in VOC oxiders when sulfur is present over conventional oxidation catalyst.

Also provided by the present invention is a method for reducing VOCs, in particular oxygen-containing VOCs, in waste gas at low temperature.

Additional features and advantages of the invention will be set forth in the description which follows, and in part will be apparent from the description or may be learned from practice of the invention. The advantages of the invention will be realized and attained by the compositions and methods particularly pointed out in the written description and claims.

To achieve these and other advantages and in accordance with the purpose of the invention, as embodied and broadly described, the catalyst of the invention comprises a perovskite supported on a metal oxide support. Additionally, the supported perovskite may be impregnated on the surface with a noble metal. In the method of the invention, the supported perovskite catalyst is contacted with a waste gas stream at a temperature sufficient to oxidize the VOCs to carbon dioxide.

It is to be understood that both the foregoing general description and the following detailed description are exemplary and explanatory and are intended to provide further explanation of the invention as claimed.

DETAILED DESCRIPTION OF THE INVENTION

The present invention is directed to a metal oxide supported perovskite catalyst. As used herein, the term "perovskite" is intended to mean metal oxides having the ideal or non-ideal perovskite-type crystalline structure.

The ideal perovskite-type crystalline structure is based on the mineral perovskite ($CaTiO_3$) and is defined by the empirical formula $ABO_3$, in which A is a cation of a metal and is coordinated to twelve oxygen atoms and B is a cation of a different metal and is coordinated to six oxygen atoms. The algebraic sum of the ionic charges on cations A and B generally equals six.

The ideal perovskite-type crystalline structure is cubic, although few compounds possess this ideal structure. A more complete description of the perovskite-type crystalline structure may be found in A. F. Wells, *Structural Inorganic*

*Chemistry,* 3d edition, 1962, pages 494–499, which is herein incorporated by reference.

The perovskite employed in the present invention is based on perovskites having the general formula $XYO_3$, where X is lanthanum, cerium or yttrium and Y is a transition metal, e.g., copper, chromium, manganese, iron, cobalt or nickel. More preferably, X is lanthanum and Y is manganese. Suitable perovskites are derived from perovskite precursors which contain cations having sufficient atomic radii and ionic charges to satisfy the requirements for perovskite formation. The requirements for perovskite formation are provided in F. Galasso, *Structure, Properties and Preparation of Perovskite-Type Compounds,* 1969, which is herein incorporated by reference.

Suitable perovskite precursor compounds include metals, metal oxides, metal hydroxides, metal nitrates and metal salts and mixtures thereof. The metals may have valences ranging from 1 to 7, such as silver, sodium, potassium, magnesium, iron, lanthanum, cobalt, manganese, aluminum and the like and mixtures thereof. The precursor compounds preferably include at least one transition metal component, i.e., at least one compound should contain an element selected from elements having atomic numbers 21 through 30, 39 through 48 and 57 through 80.

In an embodiment of the present invention, the perovskite is based on a modified $LaYO_3$ structure, in which some of the lanthanum ions have been replaced by ions of a different metal, such as silver (Ag). These perovskites have the formula $La_{1-x}A_xYO_3$, where x is not more than about 0.75, A is the metal replacing lanthanum, and Y is as defined above. Preferably, A is silver or magnesium and Y is manganese.

The metal oxide support may be any metal oxide suitable for the intended application of the inventive catalyst. Preferably, the metal oxide support is a porous metal oxide. The surface area of suitable porous metal oxides is generally in the range of 50 $m^2/g$ to 300 $m^2/g$. Illustrative examples of suitable porous metal oxides include aluminum oxides ($Al_2O_3$), silica ($SiO_2$) magnesium aluminate ($MgAl_2O_4$), titanium oxides ($TiO_2$), zirconium oxides ($ZrO_2$) or mixtures of two or more of these oxides. More preferably, the porous metal oxide support is an aluminum oxide, most preferably alumina.

The metal oxide support may be in any form suitable for the intended application of the inventive supported perovskite. Illustrative examples of suitable forms include beads, powders (such as spray-dried powders), slurries, gels, monoliths, wash coats and extrudates. Preferably, the metal oxide support is in the form of beads or extrudates. Most preferably, the metal oxide support is porous alumina beads, between 1/20" and 1/4" in diameter, with a BET surface area of 50–300 $m^2/g$ and a pore volume of greater than 0.3 cc/g.

To form the supported perovskite of the present invention, perovskite precursors are impregnated and/or deposited in and/or on the surface of the metal oxide support. The resulting material is then calcined for a suitable time at a suitable temperature to form a perovskite on the metal oxide support. The material is generally calcined at a temperature of at least 400° C., preferably ranging from 600° C. to 850° C., for about 0.5 to 8 hours.

The supported perovskite is provided with a suitable catalytic species, such as one or more noble metals or mixtures thereof, to form the final oxidation catalyst. Preferably, the supported perovskite is impregnated with an effective amount (e.g. a few parts per million up to about 0.5%) of a noble metal such as platinum or palladium followed by calcination at a suitable temperature.

In an alternative embodiment of the present invention, the metal oxide support is a metal oxide whose surface has been stabilized to prevent reaction with transition metal ions used to form the perovskite support. In such an embodiment, the metal oxide support is stabilized by forming a partial or complete intermediate metal oxide layer on the surface of the metal oxide support, which stabilizes the metal oxide support. Thereafter, the perovskite may be formed on the surface of the stabilized metal oxide support.

To form the stabilized support, the metal oxide support is preferably treated with a metal component containing compound such that ions of the metal component are impregnated on the metal oxide support. More preferably, the metal oxide support is treated with a solution of the metal component containing compound to impregnate or deposit ions of the metal component on the surface of the metal oxide support.

The thus-treated metal oxide support is then calcined for a suitable time at a suitable temperature to form a metal oxide, a mixed metal oxide or a combination thereof, on the surface of the metal oxide support thereby stabilizing the support. Preferably, the thus-treated metal oxide support is calcined at a temperature ranging from 500° C. to 1000° C. for ½ to 5 hours.

The metal component containing compound may be any compound which is capable of providing cations that will form an oxide coating on the surface of the metal oxide support. Illustrative examples of suitable metal components include magnesium, iron, cobalt, nickel, manganese, zinc, titanium, copper, chromium, lanthanum, barium, calcium, strontium and silver. Illustrative examples of suitable compounds include pure metals, metal oxides, metal hydroxides, metal nitrates and metal salts.

Once the metal oxide support has been stabilized, a perovskite layer is then formed on the stabilized metal oxide support to produce the inventive supported perovskite. The perovskite layer is preferably formed by impregnating or depositing perovskite precursors on the surface of the stabilized support. The resulting material is then calcined for a suitable time at a suitable temperature to form a perovskite on the stabilized support. Preferably, the material is calcined at a temperature of at least 400° C., generally ranging from 600° C. to 850° C., for about ½ to 8 hours.

In another embodiment of the present invention, the perovskite on the stabilized support has the formula $La_{1-x}A_xYO_3$, where x is not more than 0.75 and A and Y are as defined above. This perovskite is preferably prepared by treating the stabilized metal oxide support with aqueous nitrate solutions containing the correct stoichiometric ratio of lanthanum and the desired additional metal ions, such as silver, magnesium, iron and manganese. The thus-treated stabilized metal oxide support is then dried and calcined to form the desired supported perovskite. If appropriate, the thus-treated stabilized metal oxide support may be dried and heated to remove residual nitrates prior to calcining to form the perovskite.

The supported perovskite of the present invention may be used to oxidize VOCs, such as hydrocarbons, oxygen-containing hydrocarbons and nitrogen-containing hydrocarbons, to carbon dioxide and water at low temperatures, for example, below 550° F. Preferably, the supported perovskite may be used to oxidize oxygen-containing VOCs such as alcohols, acetates, esters, ethers, aldehydes, ketones, carboxylic acids and the like, in waste gases from such operations as bakeries, breweries, flexographic printing processes and the like, thereby reducing the levels of oxygen-containing VOCs in the waste gas. In such a preferred embodiment, the waste gas is contacted with a catalyst comprising the supported perovskite for a sufficient time at a sufficient temperature to oxidize oxygen-containing VOCs in the waste gas, most preferably to carbon dioxide and water.

The following examples of the invention are merely illustrative and should not be construed as limiting. One skilled in the art can make, without undue experimentation, various substitutions and variations and by equivalent means, performing in substantially the same manner, obtain substantially the same results without departing from the teaching and spirit of the invention.

EXAMPLE 1

Preparation of $La_{0.8}Ag_{0.2}MnO_3$ Supported on $La/Al_2O_3$ 25 g of γ-alumina beads were impregnated to 10 wt % La using lanthanum nitrate. The material was then dried and calcined at 800° C. for 2 hours. The lanthanum stabilized alumina was impregnated three times with a solution containing 6.9 g $La(NO_3)_3.6H_2O$, 0.68 g $AgNO_3$ and 3.6 g $Mn(NO_3)_2$. The resultant material was dried and calcined at 800° C. for 5–8 hours following each impregnation to form the supported $La_{0.8}Ag_{0.2}MnO_3$. The formation of a perovskite phase on the alumina was substantiated by x-ray powder diffraction. The supported $La_{0.8}Ag_{0.2}MnO_3$ contained 30 wt % of the perovskite and had a surface area of 85 $m^2/g$.

EXAMPLE 2

Preparation of $La_{0.8}Ag_{0.2}MnO_3$ Supported on $Ag/Al_2O_3$ 25 g of γ-alumina beads were impregnated to 8 wt % Ag using silver nitrate. The material was then dried and calcined at 800° C. for 2 hours. The silver stabilized alumina was impregnated three times with a solution containing 6.9 g $La(NO_3)3.6H_2O$, 0.68 g $AgNO_3$ and 3.6 g $Mn(NO_3)_2$. The resultant material was dried and calcined at 800° C. for 5–8 hours following each impregnation to form the supported $La_{0.8}Ag_{0.2}MnO_3$. The formation of a perovskite phase on the alumina was substantiated by x-ray powder diffraction. The supported $La_{0.8}Ag_{0.2}MnO_3$ contained 30 wt % of the perovskite and had a surface area of 85 $m^2/g$.

EXAMPLE 3

Preparation of $La_{0.8}Ag_{0.2}MnO_3$ Supported on $Mg/Al_2O_3$ 25 g of γ-alumina beads were impregnated to 5 wt % Mg using magnesium nitrate. The material was then dried and calcined at 800° C. for 2 hours. The magnesium stabilized alumina was impregnated twice with a solution containing 6.9 g $La(NO_3)3.6H2O$, 0.68 g $AgNO_3$ and 3.6 g $Mn(NO_3)_2$. The resultant material was dried and calcined at 500° C. for 2 hours following the first impregnation (to remove residual nitrates) and then calcined following the second impregnation at 800° C. for 5 hours to form the supported $La_{0.8}Ag_{0.2}MnO_3$. The formation of a perovskite phase on the alumina was substantiated by x-ray powder diffraction. The supported $La_{0.8}Ag_{0.2}MnO_3$ contained 20 wt % of the perovskite and had a surface area of 125 $m^2/g$.

EXAMPLE 4

Preparation of $La_{0.8}Mg_{0.2}FeO_3$ Supported on $Mg/Al_2O_3$ 25 g of γ-alumina beads were impregnated to 5 wt % Mg using magnesium nitrate. The material was then dried and calcined at 800° C. for 2 hours. The magnesium stabilized alumina was impregnated twice with a solution containing 3.5 g $La(NO_3)_3.6H_2O$, 0.52 g $Mg(NO_3)_2.6H_2O$ and 4.1 g $Fe(NO_3)_3.9H_2O$. The resultant material was dried and calcined at 400° C. for 3 hours following the first impregnation (to remove residual nitrates) and then calcined following the second impregnation at 800° C. for 5 hours to form the supported $La_{0.8}Mg_{0.2}FeO_3$. The formation of a perovskite phase on the alumina was substantiated by x-ray powder diffraction. The supported $La_{0.8}Mg_{0.2}FeO_3$ contained 30 wt % of the perovskite and had a surface area of 44 $m^2/g$.

EXAMPLE 5

Preparation of $Pt/La_{0.8}Ag_{0.2}MnO_3$ Supported on $Mg/Al_2O_3$ 25 g of γ-alumina beads were impregnated to 5 wt % Mg using magnesium nitrate. The material was then dried and calcined at 750° C. for 3 hours. The magnesium stabilized alumina was impregnated twice with a solution containing 6.9 g $La(NO_3)_3.6H_2O$, 0.64 g $AgNO_3$ and 3.6 g $Mn(NO_3)_2$. The resultant material was dried and calcined at 500° C. for 2 hours following the first impregnation (to remove residual nitrates) and then calcined following the second impregnation at 750° C. for 3 hours to form the supported $La_{0.8}Ag_{0.2}MnO_3$. The supported material was subsequently impregnated to 1800 ppm Pt using platinum amine hydroxide, then dried and calcined at 550° C. The formation of the perovskite phase on the stabilized alumina was confirmed by X-ray powder diffraction.

EXAMPLE 6

Preparation of $La_{0.8}Ag_{0.2}MnO_3$ Supported on $Al_2O_3$ 25 g of γ-alumina beads were impregnated twice with a solution containing 6.9 g $La(NO_3)_3.6H_2O$, 0.64 g $AgNO_3$ and 3.6 g $Mn(NO_3)_2$, 5 g ethanol and 10 g citric acid. The resultant material was dried under vacuum following the first impregnation (to remove the solution) and then calcined at 750° C. for 3 hours following the second impregnation to form the supported $La_{0.8}Ag_{0.2}MnO_3$. The formation of a perovskite phase on the alumina was substantiated by X-ray powder diffraction.

EXAMPLE 7

Preparation of $Pt/LaMnO_3$ Support on $Al_2O_3$ (Pt Impregnated on Perovsite)

200 g of γ-alumina beads were impregnated on 95% of incipient wetness with a solution containing 103.3 g of $La(NO_3)_3$ and 57.4 g of $Mn(NO_3)_2$. The material was dried and then calcined at 750° C. for 3 hours. The presence of the $LaMnO_3$ perovskite was confirmed by X-ray diffraction. The $LaMnO_3/Al_2O_3$ beads were then impregnated to 70% of incipient wetness with a platinum amine hydroxide solution to give the equivalent of 600 ppm Pt on the base $Al_2O_3$ material. The material was then dried and calcined at 550° C. for 1 hour.

EXAMPLE 8

Preparation of $Pt/LaMnO_3$ Supported on $Al_2O_3$ (Pt Impregnated on Perovskite)

80 g of γ-alumina beads were impregnated to 95% of incipient wetness with a solution containing 41.71 g of La(NO$_3$)$_3$ and 23 g of Mn(NO$_3$)$_2$. The material was dried and then calcined at 750° C. for 3 hours. The presence of the LaMnO$_3$ perovskite was confirmed by X-ray diffraction. The LaMnO$_3$/Al$_2$O$_3$ beads were then impregnated to 70% of incipient wetness with a platinum amine hydroxide solution to give the equivalent of 1000 ppm Pt on the base Al$_2$O$_3$ material. The material was then dried and calcined at 500° C.

EXAMPLE 9

Preparation of Pt/LaMnO$_3$ Support on Al$_2$O$_3$ (Pt Co-Impregnated with Perovskite Precursors)

50 g of γ-alumina beads were impregnated to 65% of incipient wetness with a solution containing 19.4 g of La(NO$_3$)$_3$ and 10.8 g of Mn(NO$_3$)$_2$. Immediately after the addition of the La, Mn nitrate solution, a platinum amine hydroxide solution was added to the beads to given the equivalent of 600 ppm Pt on the Al$_2$O$_3$ base material. The material was dried and then calcined at 750° C. for 3 hours. The presence of the LaMnO$_3$ perovskite was confirmed by X-ray diffraction.

EXAMPLE 10

The VOC oxidation performance of the supported perovskite catalyst prepared in Example 1 was determined and compared to the performance of a commercial catalyst containing Pt/Pd.

Figure 1:
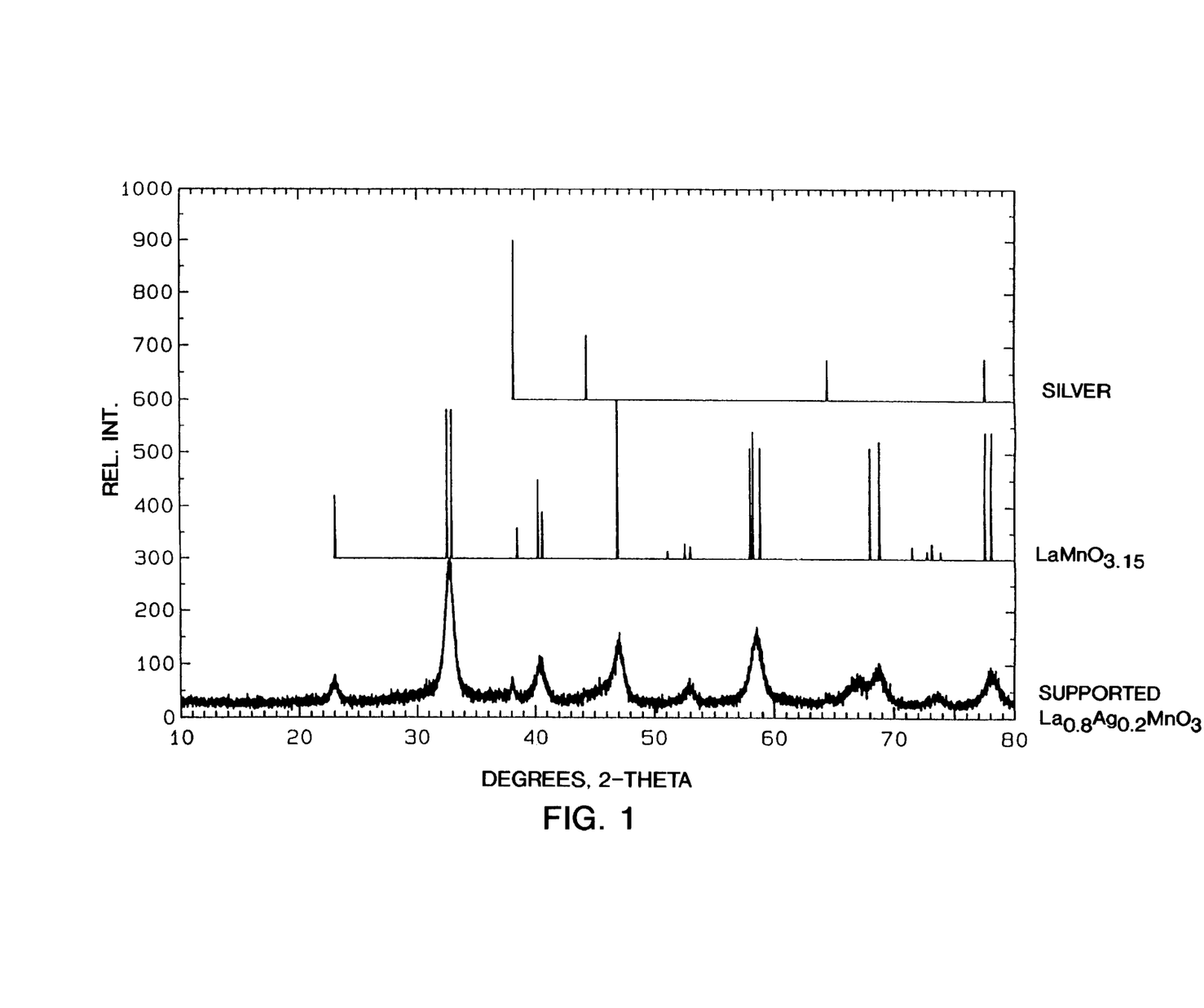
FIG. 1 shows the X-ray powder pattern for the supported perovskite of Example 1 and literature reference patterns for silver metal and $LaMnO_{3.15}$, a structurally similar perovskite.
Figure 2:
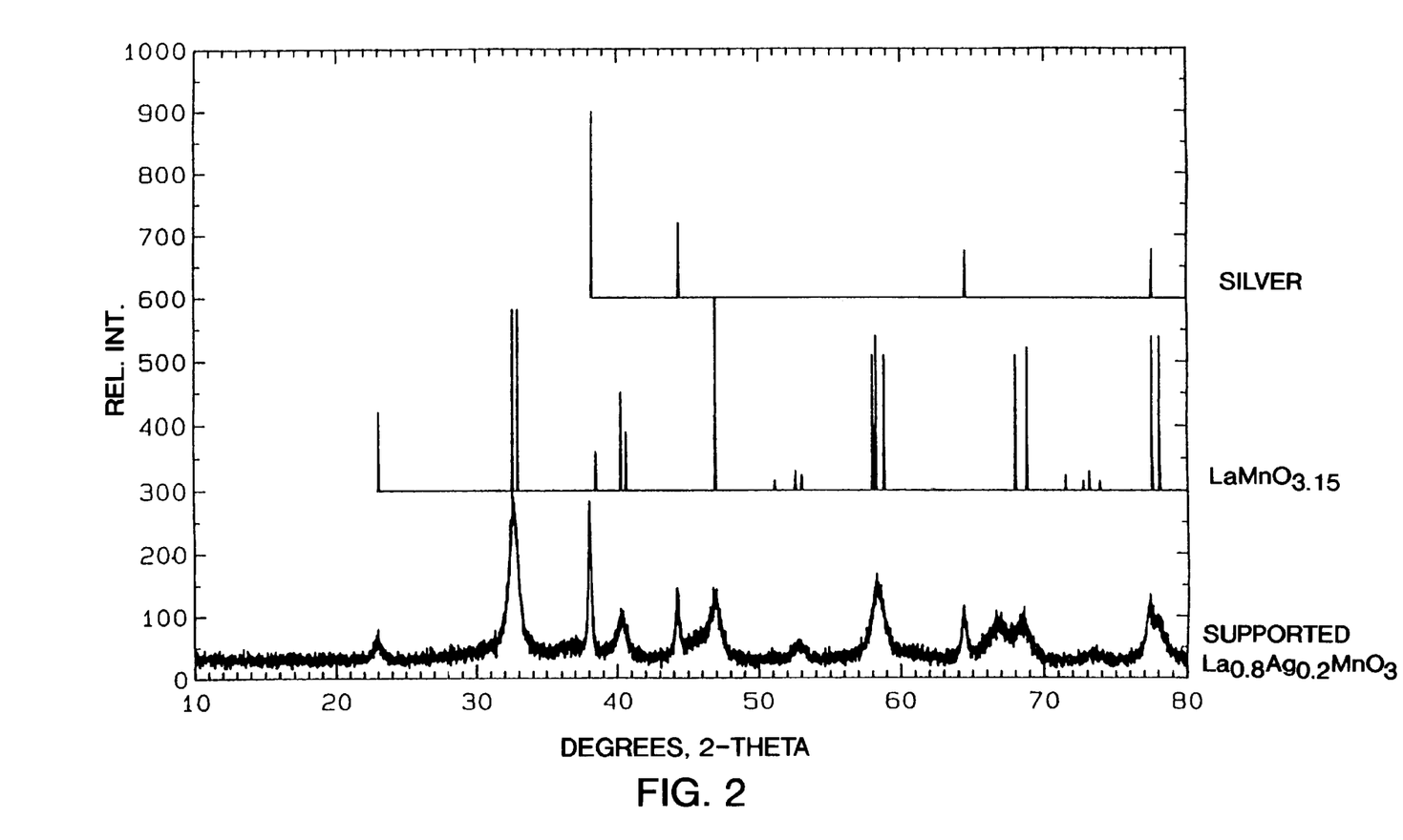
FIG. 2 shows the X-ray powder pattern for the supported perovskite of Example 2 and literature reference patterns for silver metal and $LaMnO_{3.15}$.
Figure 3:
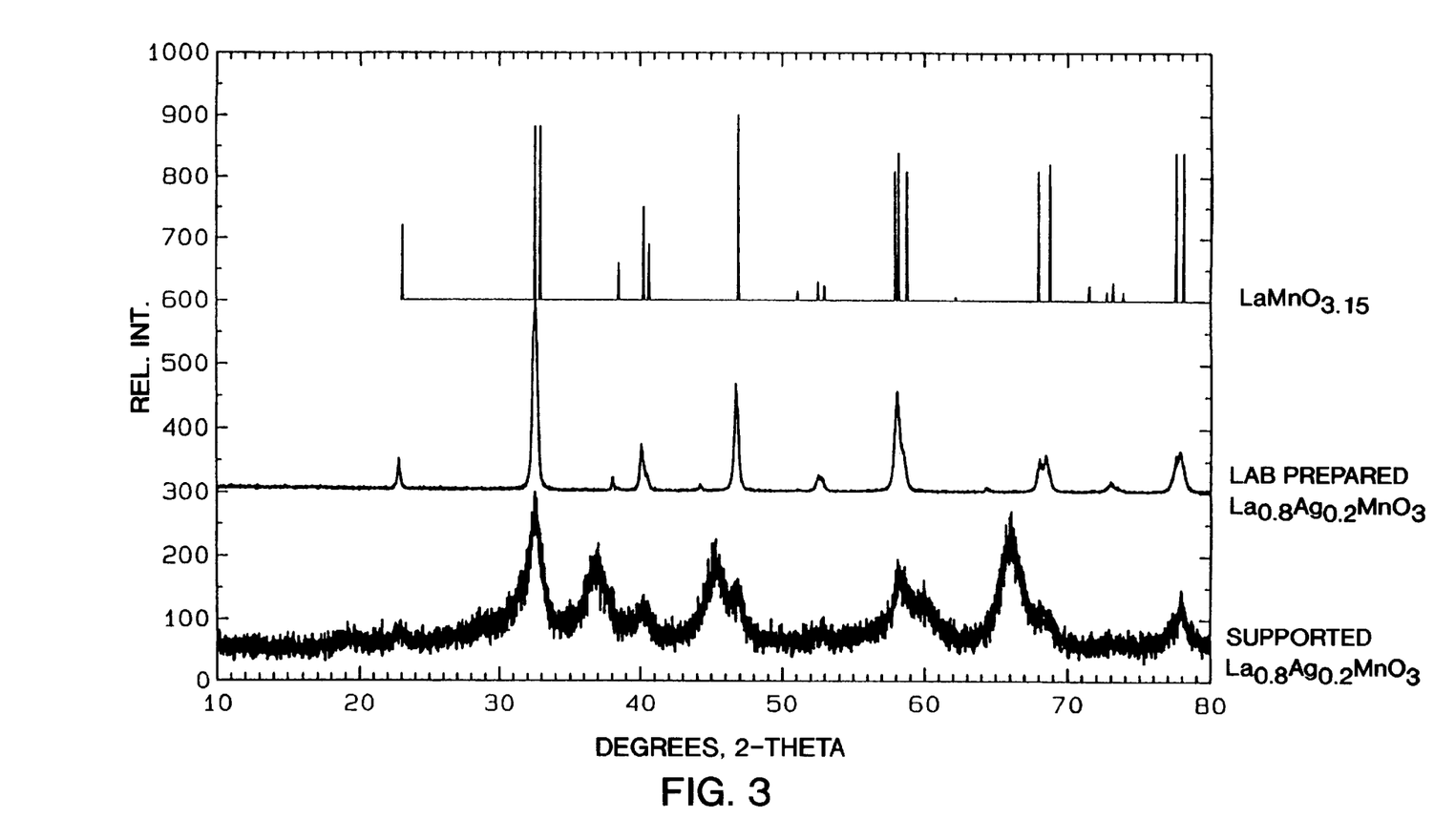
FIG. 3 shows the X-ray powder pattern for the supported perovskite of Example 3, the pattern for a laboratory preparation of pure $La_{0.8}Ag_{0.2}MnO_3$ perovskite, and a literature reference pattern for $LaMnO_{3.15}$.
Figure 4:
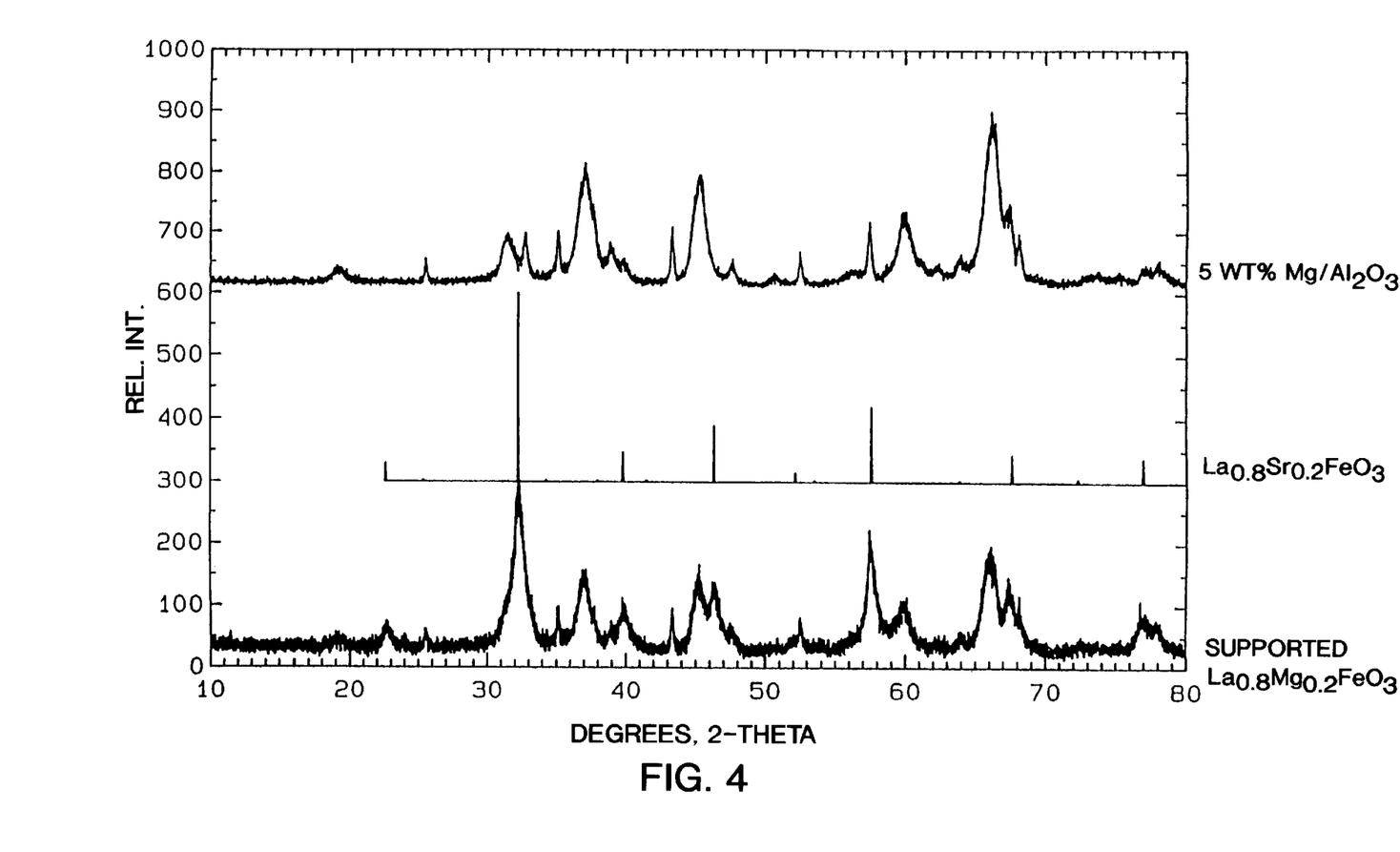
FIG. 4 shows the X-ray powder pattern for the supported perovskite of Example 4 and a literature reference pattern for $La_{0.8}Sr_{0.2}FeO_3$, a structurally similar perovskite.
Figure 5:
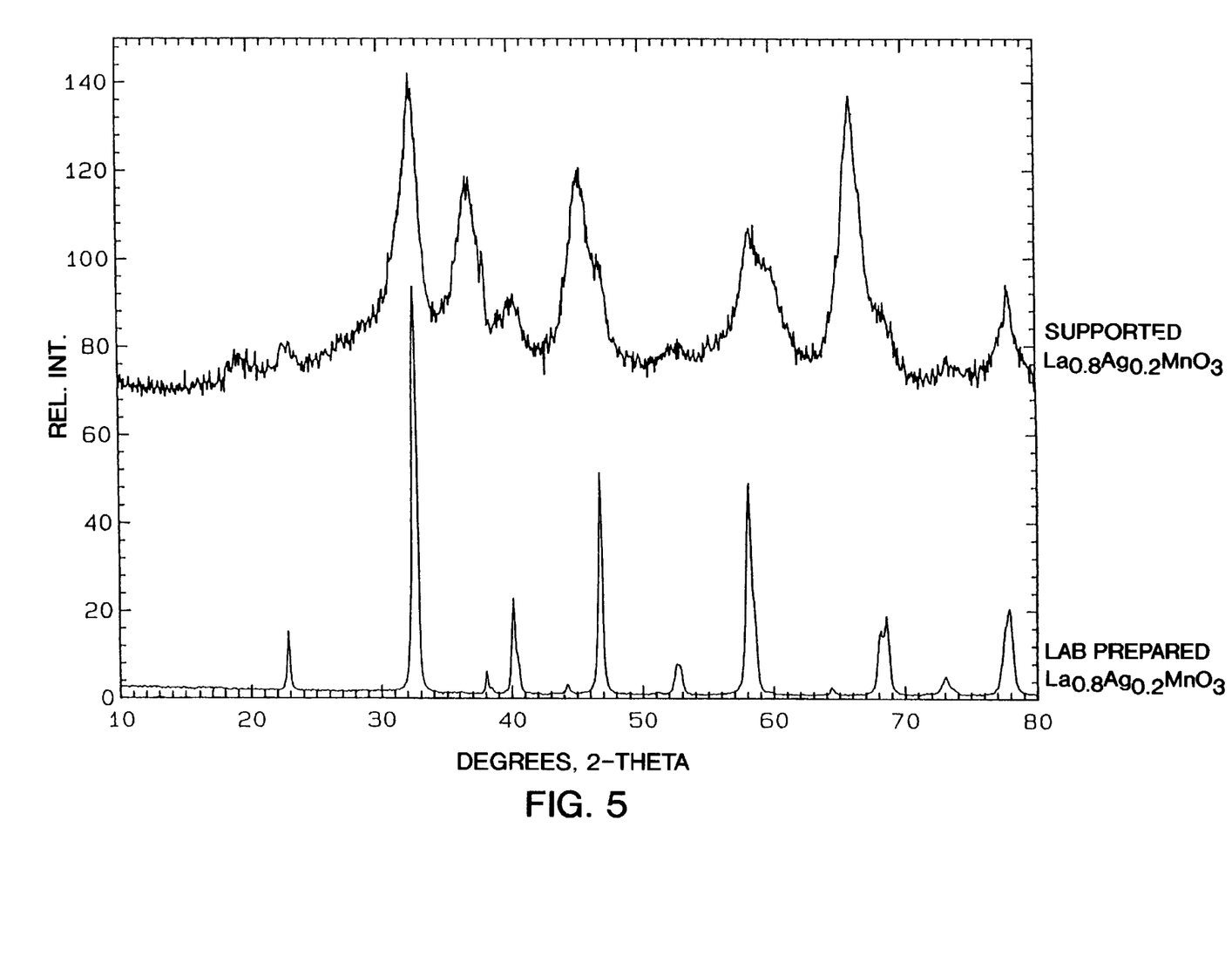
FIG. 5 shows the X-ray powder pattern for the supported perovskite of Example 5, and the pattern for a laboratory preparation of pure $La_{0.8}Ag_{0.2}MnO_5$.
Figure 6:
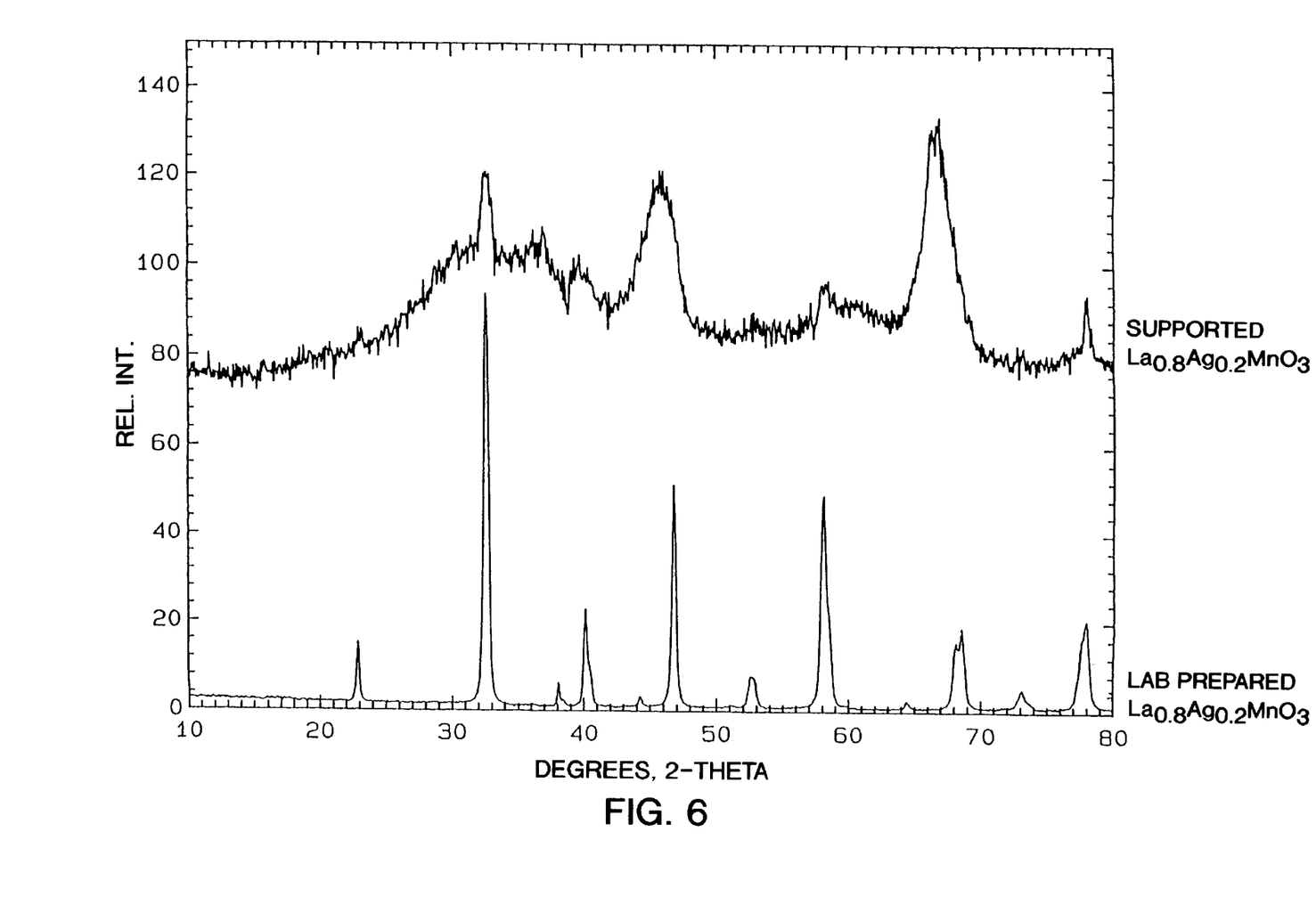
FIG. 6 shows the X-ray powder pattern for the supported perovskite of Example 6 and the pattern for a laboratory preparation of pure $La_{0.8}Ag_{0.2}MnO_3$.
Figure 7:
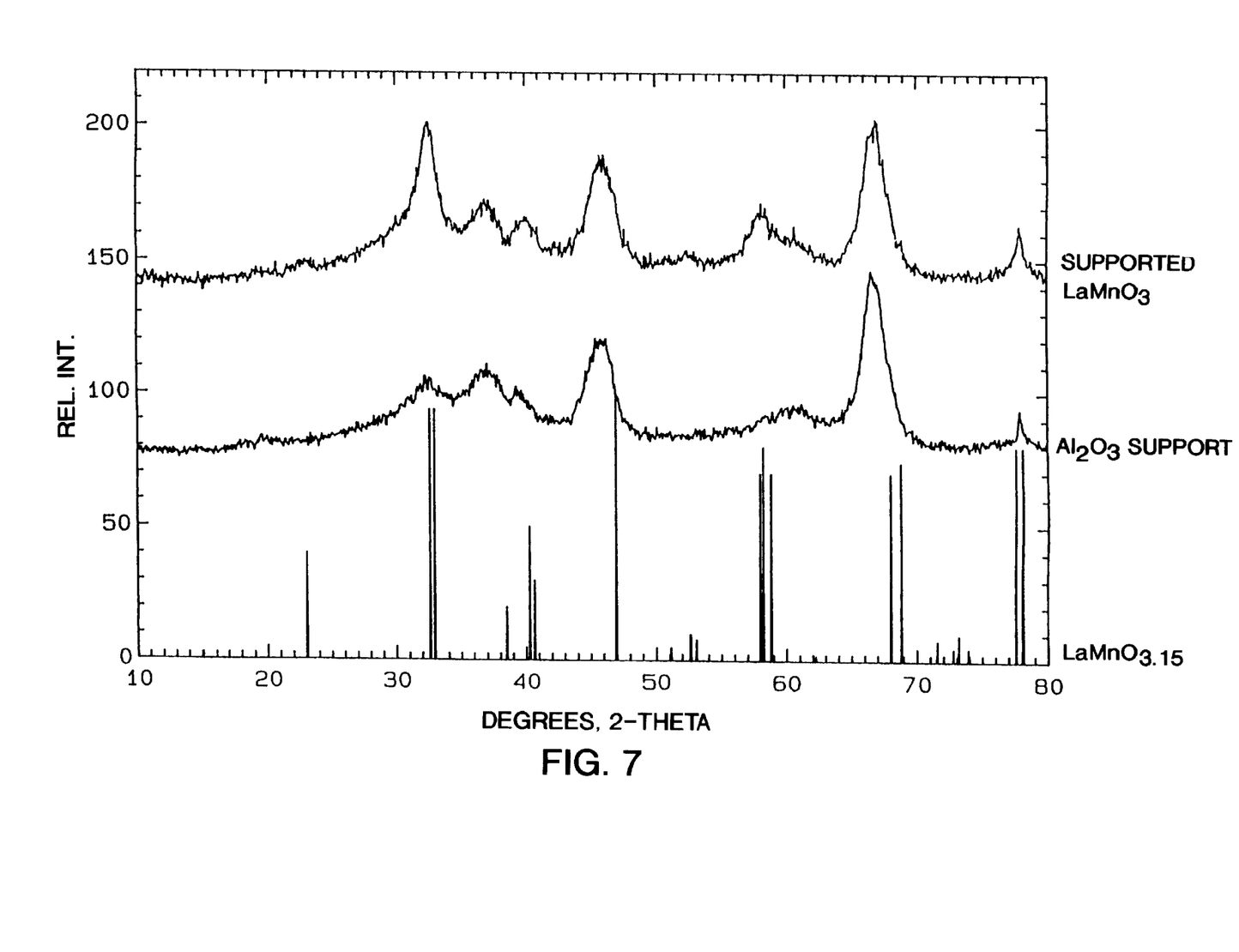
FIG. 7 shows the X-ray powder pattern for the supported perovskite of Example 7, the pattern for the $Al_2O_3$ support, and a literature reference pattern for $LaMnO_{3.15}$.
Figure 8:
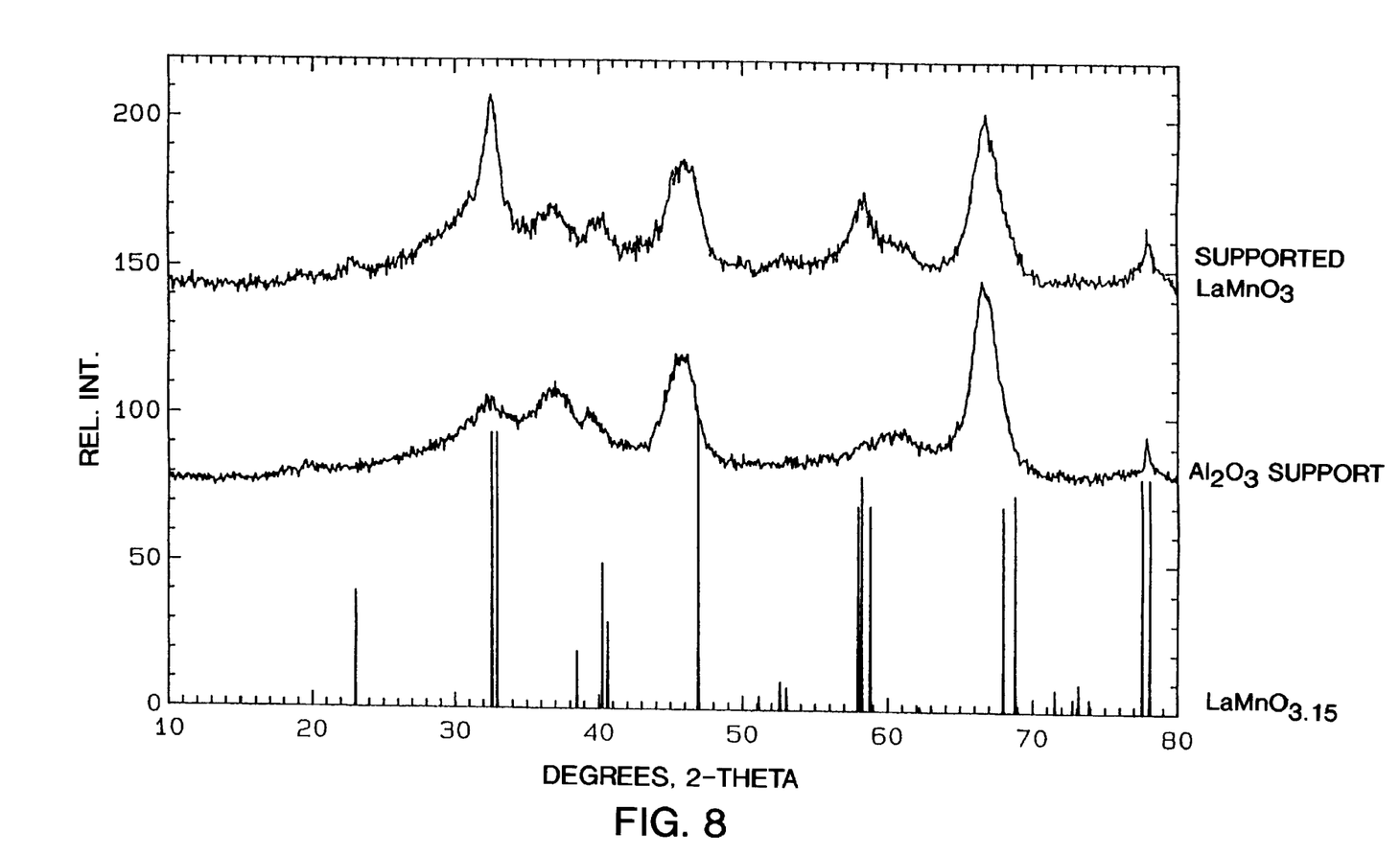
FIG. 8 shows the X-ray powder pattern for the supported perovskite of Example 8, the pattern for the $Al_2O_3$ support, and a literature reference pattern for $LaMnO_{3.15}$.
Figure 9:
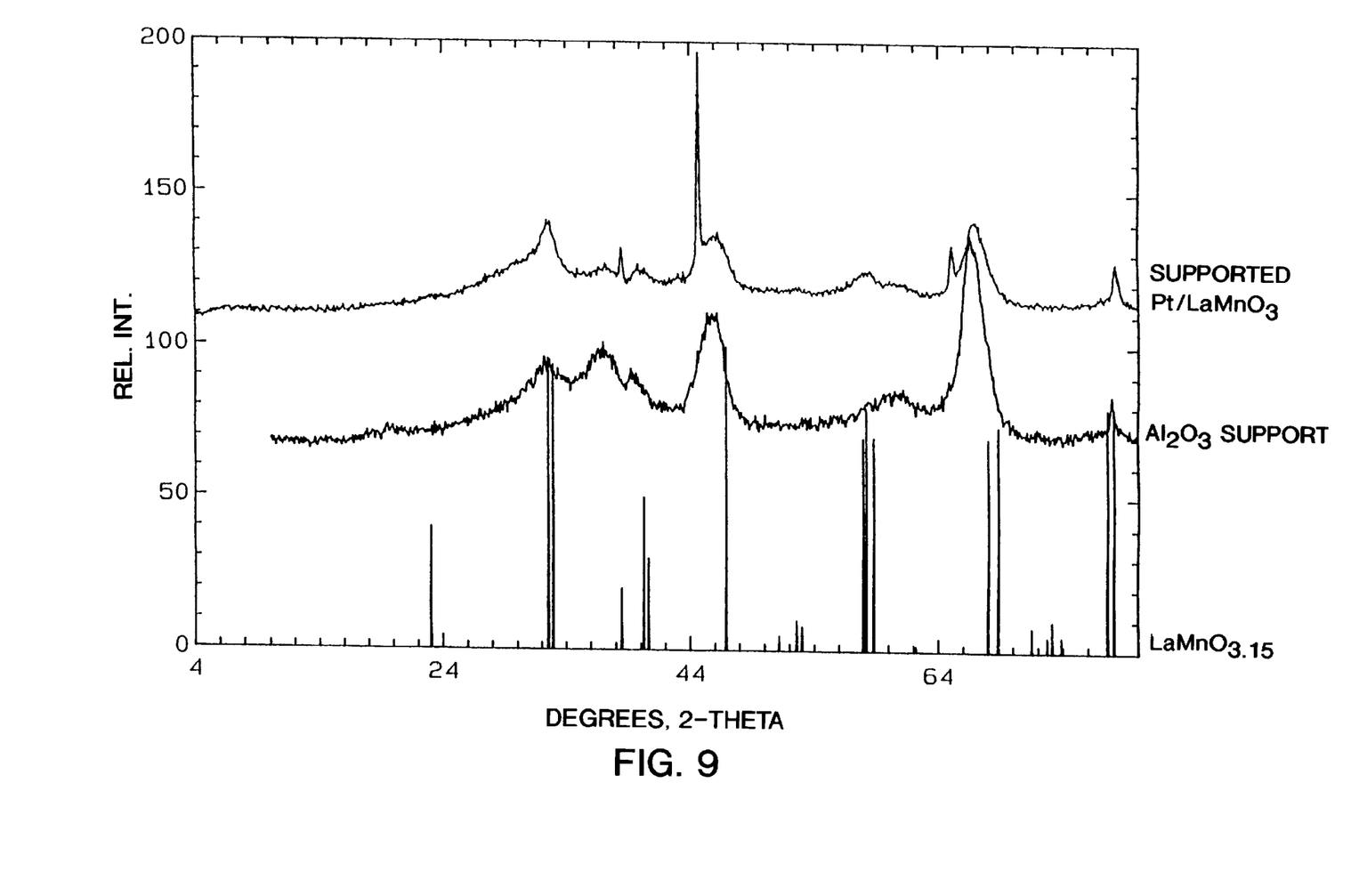
FIG. 9 shows the X-ray pattern for the supported perovskite of Example 9, the pattern for the $Al_2O_3$ support and a literature reference pattern for $LaMnO_{3.15}$.
Figure 10:
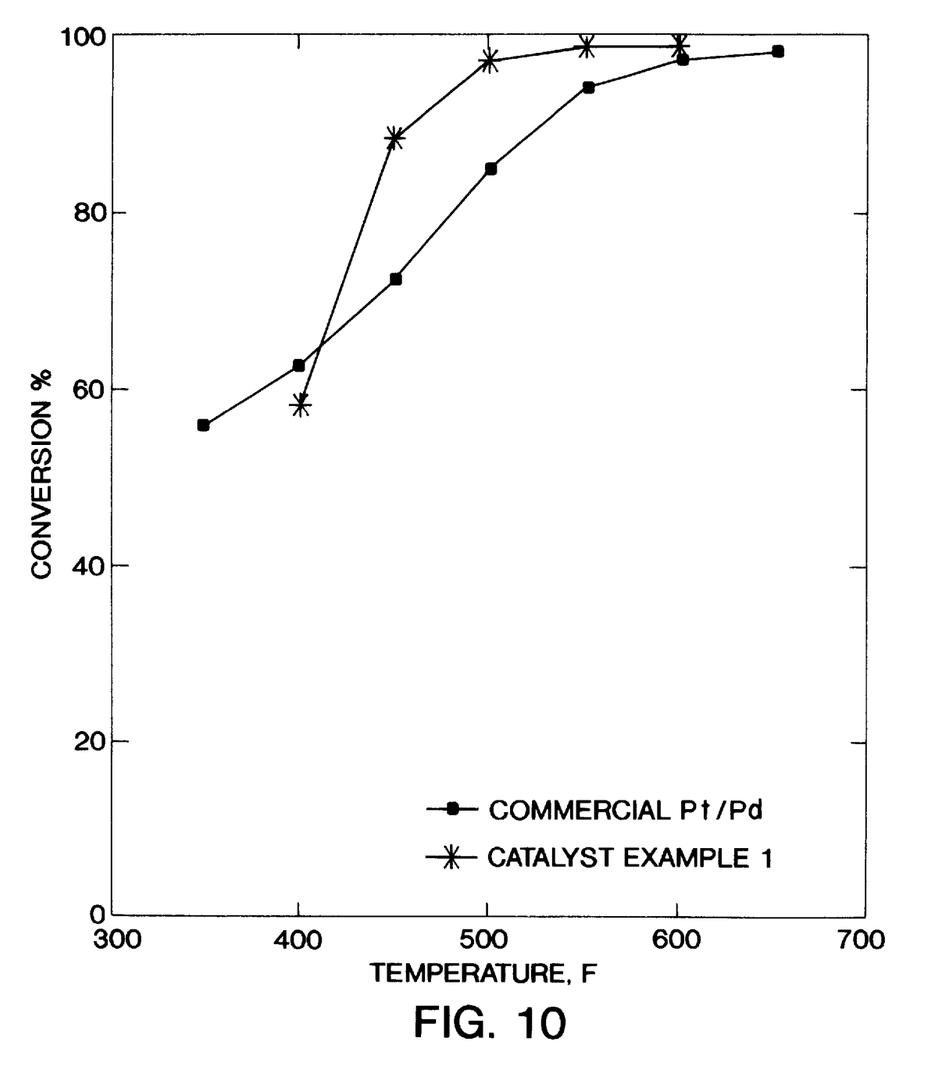
FIGS. 10 and 11 compare the conversion of ethanol versus temperature for the supported perovskite catalyst of Example 1 and a commercial catalyst containing Pt/Pd as described in Example 7.
Figure 11:
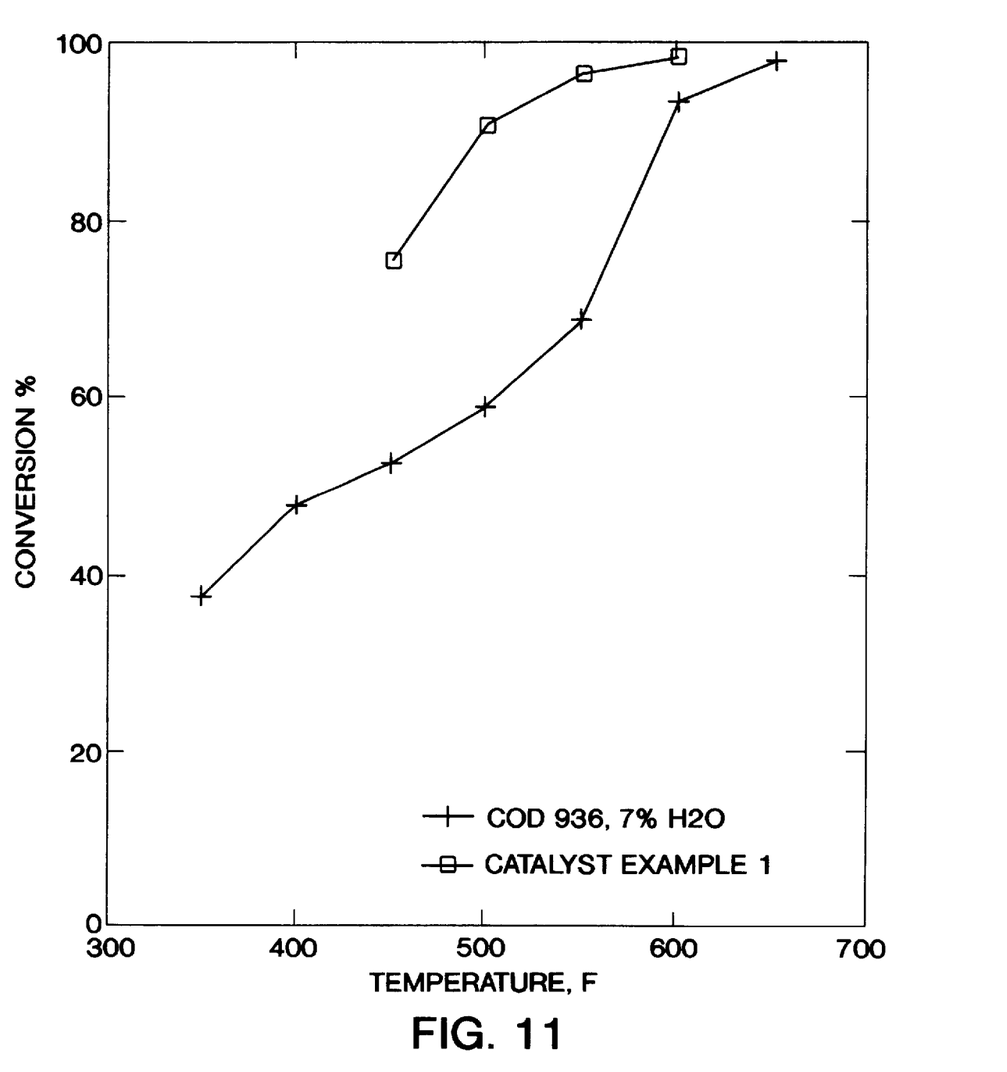

Both catalysts were tested for ethanol oxidation in a reactor under isothermal conditions (test conditions: flow rate: 12 l/min; 100 ppm ethanol; 15% O$_2$, 0% and 7% water, balance N$_2$). FIGS. 10 and 11 compare the conversion versus temperature for the two catalysts at a space velocity of 32,000 l/hr.

EXAMPLE 11

The VOC oxidation performance and sulfur resistance of the perovskite catalysts prepared in Example 7 (Pt impregnated on the perovskite) and Example 9 (Pt co-impregnated with perovskite precursor) was compared.

Both catalyst were tested for ethanol oxidation in the presence of water vapor and SO$_2$ in a reactor under the following test conditions: Flow rate; 20.1 l/min; Space velocity=30,000 l/hr; inlet temperature: 500° F., gas composition: 15% O$_2$, 17% water; 3% CO$_2$, 10 ppm SO$_2$, 850 ppm ethanol, balance N$_2$.

Figure 12:
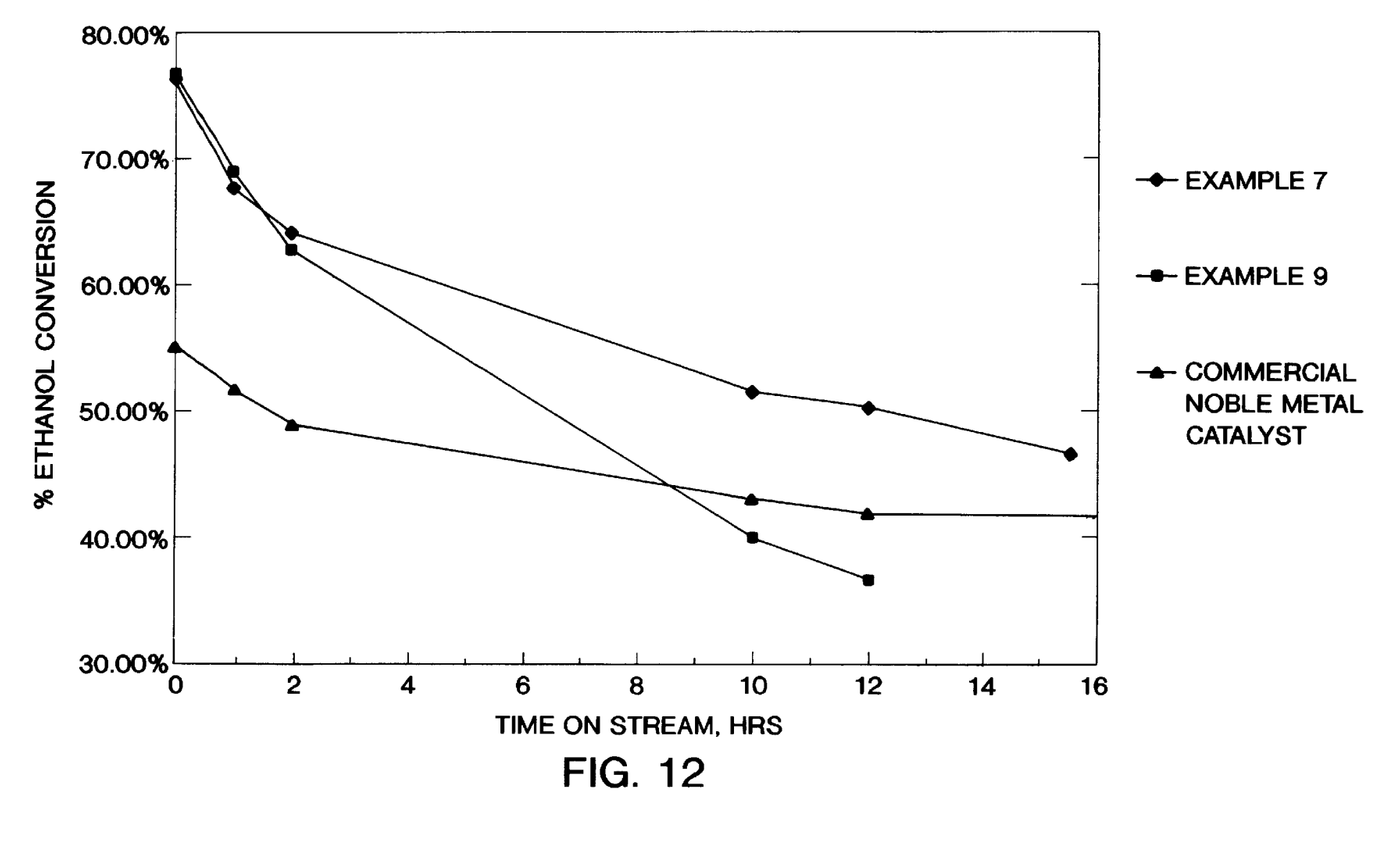
FIG. 12 compares the conversion of ethanol for a supported perovskite catalyst in Example 7 versus a perovskite catalyst in Example 9 where the noble metal is co-impregnated with the perovskite precursor.

FIG. 12 shows the activity advantage over time of the catalyst in Example 7 compared to the catalyst in Example 9 where the noble metal was co-impregnated with the perovskite precursors. Ethanol conversion over time dropped much faster for the catalyst wherein the noble metal was co-impregnated with the perovskite catalyst when exposed to SO$_2$ at the accelerated aging conditions described above.

Although preferred embodiments of the invention are described herein in detail, it will be understood by those skilled in the art that variations may be made thereto without departing from the spirit of the invention or the scope of the appended claims.

What is claimed is:

1. A method for reducing the concentration of volatile organic compounds (VOCs) in an O$_2$ containing waste gas in the presence of sulfur oxides comprising contacting said waste gas comprising sulfur oxides and at least one VOC with a catalyst consisting essentially of an aluminum oxide support; a perovskite on the surface of said aluminum oxide support, wherein the perovskite has the formula XYO$_3$, wherein X is lanthanum, cerium or yttrium; and Y is a transition metal and either or both of platinum or palladium and oxidizing the volatile organic compounds.

2. The method according to claim 1 wherein the VOC is an oxygen-containing VOC.

3. The method according to claim 2, wherein the oxygen-containing VOC is selected from the group consisting of alcohols, esters, ethers, aldehydes, ketones, carboxylic acids and acetates.

4. The method according to claim 1, wherein the aluminum oxide support is in the form of beads, powders, slurries, gels, monoliths, washcoats or extrudates.

5. The method according to claim 1, wherein the aluminum oxide support is in the form of beads or extrudates.

6. The method according to claim 1 wherein X is lanthanum.

7. The method according to claim 1, wherein the waste gas is produced by a process selected from the group consisting of fermenting, brewing, baking and flexographic printing.

8. A method for reducing the concentration of volatile organic compounds (VOCs) in a waste gas in the presence of sulfur oxides comprising contacting a waste gas comprising said sulfur oxides and at least one VOC with a catalyst consisting essentially of an aluminum oxide support stabilized by impregnating metal ions therein and calcining the thus-treated support to form either a metal oxide layer, a mixed metal oxide layer or a combination thereof; a perovskite on the surface of said aluminum oxide support, wherein the perovskite has the formula XYO$_3$, wherein X is lanthanum, cerium or yttrium; and Y is a transition metal and either or both of platinum or palladium and oxidizing the volatile organic compounds.

9. The method according to claim 8, wherein said metal oxide layer and/or said mixed metal oxide layer is made of a different metal oxide than said aluminum oxide support.

10. The method according to claim 9, wherein the metal of said metal oxide layer and/or said mixed metal oxide layer is selected from iron, magnesium, cobalt, nickel, manganese, zinc, titanium, copper, chromium, lanthanum, barium, calcium, strontium or silver.

11. A method for reducing the concentration of volatile organic compounds (VOCs) in an O$_2$ containing waste gas in the presence of sulfur oxides comprising contacting said waste gas comprising sulfur oxides and at least one VOC with a catalyst consisting essentially of an aluminum oxide support; a perovskite on the surface of said aluminum oxide support, where the perovskite has the formula La$_{1-x}$A$_x$YO$_3$ wherein x is about 0.75 or less and A is silver or magnesium and Y is manganese or iron and either or both of platinum or palladium and oxidizing the volatile organic compounds.

12. A method for reducing the concentration of volatile organic compounds (VOCs) in an O$_2$ containing waste gas in the presence of sulfur oxides comprising contacting said waste gas comprising sulfur oxides and at least one VOC with a catalyst consisting essentially of an aluminum oxide support; a perovskite on the surface of said aluminum oxide support stabilized by impregnating metal ions therein and calcining the thus-treated support to form either a metal oxide layer, a mixed metal oxide layer or a combination thereof; where the perovskite has the formula La$_{1-x}$A$_x$YO$_3$ wherein x is about 0.75 or less and A is silver or magnesium and Y is manganese or iron and either or both of platinum or palladium and oxidizing the volatile organic compounds.

* * * * *